Patented Dec. 6, 1932

1,889,751

UNITED STATES PATENT OFFICE

JOHN J. KESSLER, OF ST. LOUIS, MISSOURI, ASSIGNOR TO APPLE ELECTRICAL MANUFACTURING COMPANY, OF DAYTON, OHIO, A CORPORATION OF DELAWARE

PROCESSES FOR MAKING PHENOL-ALDEHYDE CONDENSATION PRODUCTS

No Drawing.   Application filed September 24, 1928.   Serial No. 308,127.

This invention relates to a process for the manufacture of phenol-aldehyde condensation products useful for hot or cold moulding and for many other purposes, and has for its object the production of a process of the class described by means of which condensation products including moulding compounds may be prepared which have certain new and useful qualities.

My invention refers to the class of mixtures of matter made from substances which are called phenol-aldehyde resins, and relates to a process whereby certain improvements are effected in the manufacture of these resins wherein greater speed of reaction, freedom from gaseous elements, freedom from staining qualities, and desirable electrical and mechanical properties are obtained.

It is a well known fact that in the use of moulding compounds prepared from the general class of substances known as phenol-aldehyde resins which are prepared from ordinary phenol, carbolic acid, or the cresols, cresylic acid, all of which are monohydric phenols, that is, they all contain one hydroxyl group attached to the benzene nucleus, as in the case of ordinary phenol, or one hydroxyl group attached to the toluene nucleus as in the case of the cresols, a certain time element is necessary in completing the polymerization of the compound in the mould. This time element is an important consideration in connection with the use of such compounds for moulding. Slow moulding compounds are difficult to use both on account of the greater number of moulds required to insure the necessary production and also because of the greater amount of labor required to manipulate them. Furthermore, the contact of moulding compounds with hot metal for greater lengths of time produces corrosion, wearing, and staining of these moulds. By the improved process which I am about to describe I am able to effect a shortening of the time required for moulding.

Phenol-aldehyde condensation products made from cresols are very much slower in action than phenol-aldehyde condensation products manufactured from phenol. Each type of phenol has its own characteristic reacting time. In general it may be stated that the larger the hydrocarbon nucleus attached to the hydroxyl group, the longer will be the reacting time. The hydroxyl group is the reactive part of the compound. It may be called the condensation element. The hydrocarbon nucleus is non-reacting, and while it enters into the addition product, it may be called the fluxing or softening element.

Polyhydroxyl derivatives of aromatic compounds contain twice or more as many hydroxyl groups as the corresponding monohydroxyl derivatives, and for this reason these derivatives in general show a much greater tendency to condense with reactive methylene groups; a reactivity so great, in fact, that it has not been possible to utilize them in the practical manufacture of phenol-aldehyde condensation products.

It is also a well known fact that during the process of curing moulding compounds of the monohydric phenol-aldehyde type, more or less gaseous material is eliminated. This consists in water vapor, ammonia, free phenol and other gases depending upon the proportions of raw materials used in the manufacture of the moulding compounds and upon the manner of combining them. For instance, if a moulding compound is made with traces of free phenol, this material will volatilize at the temperature of the moulding which is approximately 350° F. and form gaseous products. These products will be either eliminated from the mould through the fissures of the mould or they will be included in the finished moulding.

If the mould is opened before the strength of the moulding is sufficiently great to prevent the pressure of these gases deforming it, the moulding will be blown out by these gases or a deformation will take place on the outside of the moulding corresponding with a pocket or fissure of gas material which will form on the inside.

If the moulding compound contains an excess of hexamethylenetetramine or other hardening material of an aldehyde nature, the same effect will be produced.

In the practice of manufacturing moulding compounds from monohydric phenol-aldehyde resins, it is difficult to obtain a resin which contains neither an excess of phenol on the one hand nor an excess of aldehyde on the other hand, and it has become a general practice to add an excess of aldehyde, generally in the form of an ammonia condensation product of aldehyde, such as hexa, as the lesser of the two evils. This is a common practice in the manufacture of phenol-aldehyde moulding compounds at the present time. It is a fact, however, that the use of an excess of hexa not only tends to product stains on the surface of the mould, but it also tends to produce gaseous decomposition products. Besides this, hexa is a water soluble substance. It is more or less hygroscopic and its use is accompanied by the production of finished products of inferior electrical qualities as well as inferior mechanical qualities.

My invention refers to the combined use of polyhydric phenols together with monohydric phenols in the preparation of phenol-aldehyde condensation products.

I have found that the combined use of such compounds effects notable improvements in condensation products made from phenols by the action of aldehydes and does away with many of the present disadvantages of such condensation products, including moulding compounds, and in order to describe clearly the advantages obtained from the use of mixtures of phenols containing both mono and polyhydric phenols, I shall now give a general description of the properties of the polyhydroxyl condensation products as compared with the properties of monohydroxyl condensation products, and illustrate the manner in which the improved products claimed are obtained by the combined use of both mono and polyhydric phenols when condensed with aldehydes to form resinous condensation products.

The action of aldehydes on the higher phenols, that is, phenols containing more than one hydroxyl group in the nucleus, is quite different from the action of aldehydes on the monohydric phenols.

When resorcinol, for instance, which is meta dihydroxy benzene, and formaldehyde solution, are brought together, without any catalyst, there results, after moderate heating, at the end of a few hours a solidified jelly-like substance from which no oily addition products separate and from which water does not separate.

When a catalyst, such as ammonia, is present, the reaction is very much accelerated.

Under similar conditions, the corresponding reaction between ordinary phenol or cresol produces a liquid resin which separates from the water present and forms a distinct layer. The higher phenols cannot, therefore, be used as equivalents of the ordinary or monohydric phenols in the so called wet reactions, since the gels that are formed contain large amounts of water which is not given off until the final condensation product is formed at relatively high temperatures and when it is expelled it produces great amounts of gas and excessive shrinkage.

When resorcinol and hexa are ground together and heated, the mixture gives off ammonia and a final condensation product is formed in a very short time. The reaction is so much faster than the corresponding reaction between ordinary phenol and hexa, under the same conditions, that the intermediate or potentially reactive and plastic resin stage is passed over through such a short time interval that the use of the substance as a raw material in the manufacture of moulding compounds is impractical.

Other polyhydric phenols act in a similar manner and with the same distinguishing properties that characterize the action with resorcinol which has been described.

The action of free polyhydric phenols in a moulding compound is entirely different from the action of free monohydric phenols in a moulding compound, and to illustrate this difference I will compare the different effects of ordinary phenol or carbolic acid when present in a moulding compound in a free state with that of resorcinol when present in a moulding compound in a free state.

Free carbolic acid causes mouldings to stick, to stain, and to undercure. Its presence may be said to have a distinct wetting effect upon the moulding compound.

Free resorcinol, on the other hand, causes mouldings to leave the metal surface of the mould sharply and freely, it produces no stains, and speeds up the curing time very materially. Its use in the free state tends to neutralize the bad effects resulting from the presence of free carbolic acid or free cresylic acid.

Free carbolic acid may also be characterized as a fluxing agent. Free resorcinol may be characterized as a hardening agent. The presence of free resorcinol in a moulding compound, therefore, tends to neutralize the bad effects of free carbolic acid.

The foregoing example may be taken to illustrate further the general difference between the action of monohydric phenols and of polyhydric phenols.

The difference in action between the monohydric phenols and the polyhydric phenols may be summarized as follows: that whereas the monohydroxyl derivatives form with aldehydes resinous bodies of different degrees of hardness that finally pass into the class of bodies known as resinoids, whether produced by a wet or a dry process, that the polyhydroxyl derivatives form by a wet process, not fluid or soft, solid resins, when in the intermediate stage, which separate from the water present, but gels containing water, and when formed by a dry reaction they pass with uncontrollable speed into resinoid bodies.

My investigation of the nature of the reaction, in general, between the higher phenols and aldehydes, has led me to the conclusion that the difficulties that have prevented the development of the reaction products between the aldehydes and the higher phenols have been due to the great speed of the reactions, the large amount of heat evolved during the source of the reactions and the consequent charring, in the case of dry reactions, and the tendencies to gelatinous and non-resinous products in the case of wet reactions.

When the reactions between the higher phenols and aldehydes are conducted in the presence of monohydric phenols, however, the very qualities which have prevented the practical use of the reaction products between the higher phenols and the aldehydes, when used by themselves, can be used to the great improvement of products formed from the monohydric phenols, such as carbolic acid and cresylic acid, when condensed with aldehydes.

The higher phenols act, in the presence of carbolic acid and of cresylic acid, as hardening, non-staining, gas reducing and non-sticking combination products, when condensed with aldehydes, and very considerably increase the speed of the reaction which produces the final polymerization product, an increase so great that solid mouldings may be taken from the hot moulds after times which would only produce blown and piped mouldings where ordinary phenol is used, which is the fastest of the several monohydric phenols known.

In order to include not only dihydroxyl benzene derivatives but also derivatives containing more than two hydroxyl groups attached to the same nucleus, I shall refer in this specification to such materials, generally, under the inclusive term "polyhydric phenols", and by this term I refer to all compounds of benzene or its derivatives which contain two or more hyroxyl groups in the same nucleus or ring.

The dihydroxy benzenes are illustrations of the class of substances referred to in this specification as polyhydric phenols. There are three of these bodies. The ortho-dihydroxy benzene, the meta-dihydroxy benzene, commonly known as resorcinol, and the para-dihydroxy benzene, commonly known as hydroquinone. Other polyhydric phenols which may be used in carrying out my improved process are gallic acid, tannic acid and tannin.

I do not limit myself in this specification to aromatic compounds which contain two or more hydroxyl groups in any given ring; ring compounds containing other groups besides two hydroxyl groups are to be considered as included.

The addition of the polyhydroxy aromatic compound may be made at any stage in the preparation of the monohydric phenol-aldehyde resin. It may be added to the monohydric phenol before the reaction is started, or it may be added to the mixture of monohydric phenol and aldehyde after the reaction is started, or it may be added to the mixture of phenol aldehyde resin and filling material after they are mixed together.

If, then, to illustrate a specific case whereby the general reaction which I am describing may be carried out, there be added to a phenol-aldehyde resin varnish made from a monohydric phenol or mixture of same an amount of resorcinol approximately equal to 10 percent of the amount of phenol used in making the varnish, and this varnish be used in the manufacture of moulding compounds, the speed of reaction of the moulding compound is greatly increased and a compound can be prepared of improved moulding qualities as to the time element, the reduction of the formation of gases, and the freedom from staining. The presence of the resorcinol, to further illustrate the advantages of my improved process, tends to neutralize any excess of free aldehyde or free hexa which may be present in the compound, and on account of the presence of the additional hydroxyl groups in the compound, resinoid bodies are formed with much greater ease, so that a very small amount of free aldehyde or of free hexa will form a considerable amount of resin. Not only are the advantages of the class of substances described to be found where free aldehyde or free hexa are present, but they are also to be found where free phenols are present on account of the tendency of the additional hydroxyl groups to easily and quickly form resinous compounds.

In the event that a monohydric phenol-aldehyde resin, for instance, containing an excess of phenol is used, the presence of resorcinol tends to form additional resinous complexes in which the free phenol is either absorbed in the new resin complex, or it is dissolved in the state of solid solution and thus the effect of its tendency to form gas or its tendency to stain are neutralized, and the speed of the final reaction product is much increased.

The use of polyhydric phenols in connection with monohydric phenols has a beneficial effect in either of the three cases wherein a synthetic resin contains an excess of phenol, an excess of aldehyde, or is entirely balanced.

I do not limit myself in this invention to any special proportions between the monohydric phenols and the polyhydric phenols used. The proportions may be varied between wide limits, depending upon the end product desired, its mechanical, chemical, and electrical properties, and the time of reaction desired in any particular end product which is being designed.

To illustrate the manner in which I carry out my improved process, I now give three examples of how this may be done:

All three of these examples, and all other methods of carrying out the general process which I have described, may make use of the resins or mixtures of resins with polyhydric phenols either by using such resins or resin mixtures without the use of a solvent vehicle, or, where necessary, incorporating a solvent vehicle, such as alcohol, for the purpose of obtaining greater fluidity and penetration.

*Example No. 1.*—A mixture of mono and polyhydric phenols may be prepared by mutually dissolving them in each other, and this mixture of phenols is reacted upon by aldehydes with or without a basic catalyst, the amount of aldehyde used may be varied within wide limits depending upon the nature of the finished resin that is desired. For more fusible and soluble resins the amount of aldehyde used may be less than equimolecular proportions.

Where resins are desired which are to be finally condensed into hard insoluble and infusible condensation products, equimolecular or greater than equimolecular proportions of aldehyde may be used. If moulding compounds are to be prepared, they may be formed either by making a varnish solution of the prepared resin while still in a soluble condition and the filling material, such as wood, flour, asbestos fibre, etc., may be added.

*Example No. 2.*—Resins may be first prepared from the monohydric phenols as in the case of the present art, and after these resins are prepared the polyhydroxyl derivatives may then be added, before the final condensation is effected or before the filling material is added.

*Example No. 3.*—Monohydric phenols may be condensed with aldehyde as in the case of the present art, filling material may be added, where moulding compounds are to be prepared, and the polyhydric phenols may be added, after the filling material has been incorporated with the resin made from the monohydroxyl derivatives.

At whatever stage in the process of manufacturing a compound which has been described the polyhydroxyl derivative has been added, I find that it is not necessary to prepare a compound in such a manner as to eliminate the presence of free phenols in the finished product by the addition of an excess of aldehyde or hexa to the finished product, and one of the advantages of my present invention consists in the fact that the use of polyhydroxyl derivatives takes care of the disadvantages obtained by the presence of either free phenols or free aldehydes, as has already been described.

I am aware that in many patents allowed for processes describing phenol-aldehyde resins the word "phenol" is used in its generic sense, and that the use not only of ordinary phenol but also its homologues is frequently specified. The polyhydric phenols are phenols because they contain two or more hydroxyl groups attached to the carbon ring, but their action with aldehydes, as has been shown, is different from the action of aldehydes, on monohydric phenols.

I believe that I am the first one to discover and to describe the improvements made possible in the present art by the combined use of mixtures of mono and polyhydric phenols.

In the light of the improved condensation products that I have obtained by the use of mixtures of monohydric and polyhydric phenols, condensation products, in fact, which possess useful properties not obtainable by the use of either the mono or polyhydric phenols, when used separately, I have reached the conclusion that the combined use of these two different classes of phenols falls outside of the category of equivalents.

The term "monohydric phenol" is used in this specification and claims to designate any single phenol containing one hydroxyl group or mixture of same.

The term "polyhydric phenol" is used in this specification and claims to designate any single phenol containing more than one hydroxyl group or mixture of same.

The term "aldehyde" or "an aldehyde" is used in this specification and claims to designate any single aldehyde or condensation product of aldehyde or mixture of same.

I claim:

1. The process of making a moulding compound which consists in incorporating an inert filler with a potentially reactive resinous binder which has been prepared by the partial reaction between an aldehyde and a mixture of monohydric phenols and polyhydric phenols.

2. The process of making a moulding compound which consists in incorporating an inert filler with a potentially reactive resinous binder which has been prepared by the partial reaction product between an aldehyde, a basic catalyst and a mixture of monohydric phenols and polyhydric phenols.

3. The process of making a moulding compound which consists in incorporating an inert filler with a potentially reactive resinous binder which has been prepared by the partial reaction product between formaldehyde and ammonia, and a mixture of monohydric phenols and polyhydric phenols.

4. The process of making a moulding compound which consists in incorporating an inert filler with a potentially reactive resinous binder which has been prepared by the partial reaction between an aldehyde and a mixture of monohydric phenols, and resorcinol.

5. The process of making a moulding compound which consists in incorporating an inert filler with a potentially reactive resinous binder which has been prepared by the partial reaction between an aldehyde and a monohydric phenol and afterwards adding a polyhydric phenol.

6. The process of making a moulding compound which consists in incorporating an inert filler with a potentially reactive resinous binder which has been prepared by the partial reaction between an aldehyde, a basic catalyst, and a monohydric phenol, and afterwards adding a polyhydric phenol.

7. The process of making a moulding compound which consists in incorporating an inert filler with a potentially reactive resinous binder which has been prepared by the partial reaction between an aldehyde, ammonia and a monohydric phenol, and afterwards adding a polyhydric phenol.

In testimony that I claim the foregoing I hereunto affix my signature.

JOHN J. KESSLER.